(12) United States Patent
Leonard et al.

(10) Patent No.: US 7,990,120 B2
(45) Date of Patent: Aug. 2, 2011

(54) CIRCUITS AND METHODS FOR ADJUSTABLE PEAK INDUCTOR CURRENT AND HYSTERESIS FOR BURST MODE IN SWITCHING REGULATORS

(75) Inventors: Jason Leonard, Moncure, NC (US); Joey Martin Esteves, Tracy, CA (US)

(73) Assignee: Linear Technology Corporation, Milpitas, CA (US)

( * ) Notice: Subject to any disclaimer, the term of this patent is extended or adjusted under 35 U.S.C. 154(b) by 288 days.

(21) Appl. No.: 11/499,005

(22) Filed: Aug. 4, 2006
(Under 37 CFR 1.47)

(65) Prior Publication Data
US 2008/0030178 A1   Feb. 7, 2008

(51) Int. Cl.
G05F 1/00 (2006.01)
G05F 3/16 (2006.01)

(52) U.S. Cl. ........................................ 323/282; 323/224

(58) Field of Classification Search .................. 323/282, 323/284, 285, 224, 222; 324/433, 426
See application file for complete search history.

(56) References Cited

U.S. PATENT DOCUMENTS

| | | |
|---|---|---|
| 3,579,091 A | 5/1971 | Clarke et al. |
| 3,581,186 A | 5/1971 | Weinberger |
| 3,772,588 A | 11/1973 | Kelly et al. |
| 3,863,128 A | 1/1975 | Wilwerding |
| 3,978,393 A | 8/1976 | Wisner et al. |
| 4,071,884 A | 1/1978 | Maigret |
| 4,578,630 A | 3/1986 | Grosch |
| 4,634,956 A | 1/1987 | Davis et al. |
| 4,672,303 A | 6/1987 | Newton |
| 4,929,882 A | 5/1990 | Szepesi |
| 5,481,178 A | 1/1996 | Wilcox et al. |
| 5,528,125 A | 6/1996 | Marshall et al. |
| 5,617,016 A * | 4/1997 | Borghi et al. ................. 323/284 |
| 5,705,919 A | 1/1998 | Wilcox |
| 5,731,731 A | 3/1998 | Wilcox et al. |
| 5,745,352 A | 4/1998 | Sandri et al. |
| 5,773,966 A | 6/1998 | Steigerwald |

(Continued)

FOREIGN PATENT DOCUMENTS

JP 3-113986 11/1991

(Continued)

OTHER PUBLICATIONS

U.S. Appl. No. 11/409,549, filed Apr. 20, 2006, Esteves et al.

(Continued)

*Primary Examiner* — Adolf Berhane
*Assistant Examiner* — Emily Pham
(74) *Attorney, Agent, or Firm* — McDermott Will & Emery LLP

(57) ABSTRACT

Switching regulator circuits and methods are provided for regulating output voltage that include an adjustable minimum peak inductor current level and adjustable burst comparator hysteresis for Burst Mode operation in switching regulators. Control over minimum peak inductor current level and burst comparator hysteresis is achieved during Burst Mode operation by allowing external user control of the burst threshold level and the burst comparator hysteresis. A single user-accessible input pin, two user-accessible input pins, or three user-accessible input pins may be used to distinguish between forced continuous and Burst Mode operations, set a burst threshold level, and set a burst comparator hysteresis during Burst Mode operation. The present invention may be applied to buck, boost, buck-boost, or any other suitable regulator circuit configuration. The present invention also may be employed with synchronous and non-synchronous switching regulators.

26 Claims, 9 Drawing Sheets

U.S. PATENT DOCUMENTS

| | | | |
|---|---|---|---|
| 5,929,620 | A | 7/1999 | Dobkin et al. |
| 5,994,885 | A | 11/1999 | Wilcox et al. |
| 6,127,815 | A | 10/2000 | Wilcox |
| 6,177,678 | B1 | 1/2001 | Brass et al. |
| 6,215,288 | B1 | 4/2001 | Ramsey et al. |
| 6,268,764 | B1 * | 7/2001 | Eagar et al. .................. 327/539 |
| 6,304,088 | B1 * | 10/2001 | Yee ............................. 324/433 |
| 6,307,356 | B1 | 10/2001 | Dwelley |
| 6,348,780 | B1 * | 2/2002 | Grant ........................... 323/222 |
| 6,366,066 | B1 | 4/2002 | Wilcox |
| 6,462,525 | B1 | 10/2002 | Chen |
| 6,580,258 | B2 | 6/2003 | Wilcox et al. |
| 6,674,274 | B2 | 1/2004 | Hobrecht et al. |
| 6,724,174 | B1 | 4/2004 | Esteves et al. |
| 6,801,026 | B2 * | 10/2004 | Schrom et al. ................ 323/272 |
| 6,894,471 | B2 * | 5/2005 | Corva et al. .................. 323/282 |
| 7,030,596 | B1 * | 4/2006 | Salerno et al. ................ 323/282 |
| 7,394,669 | B2 * | 7/2008 | Fahlenkamp et al. ...... 363/21.15 |
| 7,480,588 | B1 * | 1/2009 | Walker ......................... 702/132 |
| 2005/0221844 | A1 * | 10/2005 | Trethewey et al. ........ 455/456.6 |

FOREIGN PATENT DOCUMENTS

| | | |
|---|---|---|
| JP | 4-42771 | 2/1992 |

OTHER PUBLICATIONS

Blanchard, Richard, et al., "MOSFETs, Schottky Diodes Vie for Low-Voltage-Supply Designs," EDN, p. 197, Jun. 28, 1984.

Borghi et al., "Discontinuous Conduction Mode Power Switching Regulator IC," PCI Oct. 1988 Proceedings, pp. 31-41, Oct. 1988.

Cassani, John C. et al., "Sophisticated Control IC Enhances 1MHz Current Controlled Regulator Performance," Proceedings of HFPC, May 1992, pp. 167-173.

Gontowski et al., "Advanced New Integrated Circuits for Current-Mode Control," Proceedings of the Power Electronics Show and Conference, pp. 341-352, Oct. 1986.

Goodenough, F., "Dozing IC Op Amps Wake Up for Input Signal," Electronic Design, Dec. 5, 1991.

Goodenough, F., "Raise Switcher Efficiency Above 90%", Electronic Design, Jan. 21, 1993.

Goodenough, Frank, "Low-Voltage Analog ICs Wait in the Wings," Electronic Design, Sep. 3, 1992.

Goodenough, Frank, "Synchronous Rectifier UPS PC Battery Life," Electronic Design, pp. 47-53, Apr. 16, 1992.

Gracie, Paul D., "Intermittent Converter Saves Power," EDN, p. 151, Sep. 1, 1989.

Harris Semiconductor, Hodgins et al., "HIP 5060 Family of Current Mode Control ICs Enhance 1 MHZ Regulator Performance," Application Note AN9212.1, pp. 11-191 to 11-197, 1992.

Huffman, B., "Efficiency and Power Characteristics of Switching Regulator Circuits," Application Note 46, Linear Technology, Nov. 1991.

International Rectifier, Clemente et al., "HV Floating MOS-Gate Driver IC," Application Note AN-978A, 1990.

Linear Technology, "LT1170/LT1171/LT1172 100kHz 5A, 2.5A, 1.25A High Efficiency Switching Regulators," Data Sheet, 1991.

Linear Technology, "LT1846/1847, LT3846/3847 Current Mode PWM Controller," Datasheet, 1990.

Linear Technology, "LTC1148/LTC1148-3.3/LTC1148-5 High Efficiency Synchronous Stepdown Switching Regulators," Preliminary Datasheet, Nov. 1992.

Linear Technology, Nelson, C., App. Note 19, "LT-1070 Design Manual," Jun. 1986.

Linear Technology, "LT1529/LT1529-3.3/LT1529-5: 3A Low Dropout Regulators with Micropower Quiescent Current and Shutdown," Datasheet, 1995.

Linear Technology, "LTC1435: High Efficiency Low Noise Synchronous Step-Down Switching Regulator," Datasheet, 1996.

Linear Technology, "LTC1436A/LTC1436A-PLL/LTC1437A: High Efficiency Low Noise Synchronous Step-Down Switching Regulators," Datasheet, 1996.

Linear Technology, "LTC1438/LTC1439: Dual High Efficiency, Low Noise, Synchronous Step-Down Switching Regulators," Datasheet, 1997.

Linear Technology, "LTC1735: High Efficiency Synchronous Step-Down Switching Regulator," Datasheet, 1998.

Linear Technology, "LTC1736: 5-Bit Adjustable High Efficiency Synchronous Step-Down Switching Regulator," Datasheet, 1999.

Linear Technology, "LTC3412: 2.5A, 4MHz, Monolithic Synchronous Step-Down Regulator," Datasheet, 2002.

Micro Linear Corporation, "ML4873 Battery Power Control IC," Advance Information Data Sheet, Mar. 15, 1993, pp. 1-8.

Micro Linear Corporation, "ML4873 Battery Power Control IC," Datasheet, Jan. 1997 (preliminary version Mar. 1993).

Redl et al., "Frequency Stabilization and Synchronization of Free-Running Current-Mode Controlled Converters," PESC '86 Record, pp. 519-530, 1986.

Siliconix, "Si9150 Synchronous Buck Regulator Controller, S-42677, Rev. D," Datasheet, Feb. 14, 1995.

Williams, J. and Huffman, B., "Proper instrumentation eases low-power dc/dc converter design," EDN, Oct. 27, 1988.

Williams, J., "Basic Principles and Ingenious Circuits Yield Stout Switchers," EDN, Jan. 18, 1990.

Williams, J., "Conversion techniques adapt voltages to your needs," EDN, Nov. 10, 1982.

Williams, J., "Designing supplies for powering LCD backlighting," EDN, Oct. 29, 1992.

Williams, J., "Micropower circuits assist low-current signal conditioning," EDN, Aug. 6, 1987.

Williams, J., "Regulator IC speeds design of switching power supplies," EDN, Nov. 12, 1987.

Williams, J., "Switching regulator takes on more power," Electronic Product Design, Jan. 1986.

Williams, J., "Use low-power design methods to condition battery outputs," EDN, Oct. 18, 1984.

* cited by examiner

CIRCUITS AND METHODS FOR ADJUSTABLE PEAK INDUCTOR CURRENT AND HYSTERESIS FOR BURST MODE IN SWITCHING REGULATORS

FIELD OF THE INVENTION

The present invention relates to circuits and methods for providing a user the ability to adjust the minimum peak inductor current level and hysteresis of switching regulators when operating in BURST MODE® (hereinafter, "Burst Mode").

BACKGROUND OF THE INVENTION

The present invention relates to voltage regulators. More particularly, this invention relates to circuits and methods that provide the ability to adjust the minimum peak inductor current level and hysteresis for Burst Mode in current-mode DC-DC regulators (i.e. regulators that respond to measurements of output current or of signals indicative of output current).

Voltage regulators are power supply circuits that use a closed loop design to provide a predetermined and substantially constant output voltage, even while using an input voltage source which may be poorly specified or fluctuating. Furthermore, many electronic products use voltage regulators to convert an input voltage into a regulated output voltage that may be higher or lower than the input voltage. Accordingly, voltage regulators function as both a voltage converter in addition to a voltage stabilizer.

There are two major types of regulators: linear regulators and switching regulators. In a typical linear regulator, the output voltage is regulated by adjusting a passive element (e.g., a variable resistor) to control a continuous flow of current from the voltage source to the load.

Switching regulators, on the other hand, are essentially DC-DC converters that operate by switching current ON and OFF to control the output voltage. Switching voltage regulators typically employ one or more switching devices, along with an inductor and a capacitor in order to store and transfer energy to a load. These regulators are able to regulate the voltage being supplied to the load by turning the switching element(s) ON and OFF, thereby controlling the amount of power being transmitted through the inductor in the form of discrete current pulses. The inductor and the capacitor convert the supplied current pulses into a steady load current so that the load voltage is regulated. Ultimately, regulation of the output voltage is achieved through adjustment of the switch ON-OFF timings based on feedback signals indicative of the output voltage and load current.

Switching regulators that operate in current-mode are particularly desirable. They provide good line and load transient signal rejection, and possess inherent current-limiting capabilities during fault conditions (e.g., output short circuits). Many current-mode switching regulators monitor the inductor current and compare it with a peak inductor current level to determine when it is appropriate to turn OFF the main switching element, thereby eliminating the supply of excess current.

Many current-mode switching regulator circuits include the following: a logic section, an output switch or switches controlled by the logic section, an oscillator for providing periodic timing signals to turn ON the main switch, a current amplifier that relays a sense voltage that is dependent on the inductor current, an error amplifier that adjusts its output voltage depending on load conditions, and a current comparator that produces a signal that causes the logic section to turn OFF the main switch when the sense voltage compares in a predetermined manner with the voltage emerging from the error amplifier.

A particular type of regulator which often operates in current-mode as described above is the synchronous switching regulator. These regulators have a main switching element and a synchronous switching element which are driven out-of-phase with respect to each other in order to supply current at a regulated voltage to a load. Synchronous switching regulators differ from non-synchronous switching regulators in that a diode is replaced with a synchronous switching element, and the result, typically, is decreased power loss in the switching regulator.

A major benefit of switching regulators, such as synchronous switching regulators, is that they typically exhibit greater efficiency (where efficiency is defined as the ratio of the power provided by the regulator to the power provided to the regulator) than can be found in linear regulators, thereby leading to significant reductions in unwanted heat dissipation. As a result, many switching regulators can eliminate the use of a heat sink that an equivalent linear design would require.

In particular, synchronous switching regulators that employ MOSFET (metal-oxide semiconductor field-effect transistor) switches are widely used in portable battery-powered electronic products and products in which only limited heat generation can be tolerated. Because these voltage regulators exhibit higher efficiency, they provide relatively long battery life with little heat generation. For this reason, these regulators are often employed in systems such as cellular telephones, cordless telephones, personal pagers, laptop computers, and wireless modems.

The efficiency of switching regulators, however, is not always maximized and varies proportionally to the size of the load. It is a function of output current and typically decreases when the switching regulator is providing small amounts of current to the load. This occurs because even as the load decreases, a fixed amount of power is dissipated in the drive circuitry irrespective of the load size.

The above-described loss of efficiency at lighter loads is common in switching regulators that operate in a forced continuous mode of operation. In forced continuous mode, the efficiency loss at lighter loads for switching regulators becomes greater because the main switch is periodically turned ON and OFF regardless of operating conditions. Therefore, these regulators may become inefficient for smaller loads because of the energy, in the form of gate charge, that is required to constantly turn the main switch and synchronous switch ON and OFF regardless of load conditions.

An effective alternative to operating in forced continuous mode is to allow the regulator to enter Burst Mode operation. When operating in this mode, the regulator may omit switching cycles when the load is light, thereby reducing transistor gate charge losses. This is possible because, when operating in Burst Mode, the active switching elements (e.g., the switching transistor(s)) and optionally other unneeded portions of the regulator circuit are made to remain OFF as the load current drops below a specified value. The mode of operation when the active switching elements are made to remain OFF also is referred to herein as sleep mode. In a synchronous switching regulator, both the main and synchronous switching elements are made to remain OFF during sleep mode. In a non-synchronous switching regulator, only the main switching element is made to remain OFF. As one of ordinary skill in the art will understand, there may be different implementations of Burst Mode operation in different switching regulators. For example, different implementations may include different circuits and methods (1) to determine when a switching regulator enters sleep mode and/or (2) to charge the output capacitor. Burst Mode operation is used to reduce switching losses in a switching regulator and increase the operating efficiency at low output current levels.

Available regulators capable of operating in Burst Mode use essentially the same circuitry as described above for typical switching regulators, with the addition of a burst comparator and circuitry that provides a burst threshold level. This additional circuitry may be used to shut down part of a regulator circuit under specified conditions in order to reduce power consumption. Examples of regulators that use Burst Mode and forced continuous mode are marketed by Linear Technology Corporation, Milpitas, Calif., and include the LTC1435 and LTC1735 series products.

A disadvantage of some Burst Mode type regulators results from the inability to externally control the burst threshold level, which sets the minimum peak inductor current level. For higher burst threshold levels, the efficiency at light loads is higher at the expense of higher output voltage ripple (an undesirable characteristic). For lower burst threshold levels, the output voltage ripple is lower at the expense of slightly reduced efficiency for light loads. Accordingly, because the burst threshold level, which sets the minimum peak inductor current level, is fixed internally in current regulators that operate in Burst Mode, the output voltage ripple and efficiency of the regulator cannot be tailored to fit the requirements of different applications.

One way to adjust the output voltage ripple and efficiency of the regulator to fit the requirements of different applications is by externally setting the burst threshold level, as described in U.S. Pat. No. 6,724,174 to Esteves et al. This sets the minimum peak inductor current level, thereby permitting the output voltage ripple and efficiency to be adjusted to suit the requirements of various applications. At higher burst threshold levels, the efficiency at light loads would be higher at the expense of higher output voltage ripple (which, depending on the application, is an undesirable characteristic). At lower burst threshold levels, the output voltage ripple would be lower at the expense of slightly reduced efficiency for light loads. Externally setting the burst threshold level allows the switching regulator's output voltage ripple and efficiency to be tailored to the needs of a particular application.

Available Burst Mode regulators that permit external setting of the burst threshold level may use essentially the same circuitry as described above for regulators that use Burst Mode and forced continuous mode, with the addition of an adjustable burst clamp. This circuitry sets the minimum peak inductor current level according to the burst threshold level, which is set externally. Examples of Burst Mode regulators that use an adjustable burst clamp are the LTC3412, LTC3414, and LTC3418 series products marketed by Linear Technology Corporation, Milpitas, Calif.

In those Burst Mode regulators that use an adjustable burst clamp, the burst comparator hysteresis is fixed internally within the switching regulator. Since the only way to adjust the output voltage ripple amplitude and frequency in Burst Mode regulators using an adjustable burst clamp is by varying the minimum peak inductor current, the user has only one degree of control over the output voltage ripple and efficiency in tailoring them to fit the different requirements of each application.

Furthermore, for higher burst threshold levels, the efficiency at light loads is generally higher at the expense of higher output voltage ripple for those Burst Mode regulators that use an adjustable burst clamp. When the output voltage ripple exceeds a certain magnitude, however, there is a loss of efficiency in such regulators because of DC losses in the conduction path.

In view of the foregoing, it would be desirable to provide circuits and methods for permitting a user to externally set the minimum peak inductor current level.

It would also be desirable to provide circuits and methods for permitting a user to externally set the hysteresis of a Burst Mode comparator in switching regulators to increase efficiency of a regulator.

It further would be desirable to provide circuits and methods for permitting a user to more fully adjust the voltage ripple of the regulated output voltage of a regulator over a continuous range of values.

SUMMARY OF THE INVENTION

It is therefore an object of the present invention to provide circuits and methods for permitting a user to vary the burst threshold level, thereby allowing for the selection of a desired minimum peak inductor current level in switching regulators operating in Burst Mode.

It is also an object of the present invention to provide circuits and methods for permitting a user to vary the burst comparator hysteresis in switching regulators operating in Burst Mode.

It is further an object of the present invention to provide circuits and methods for permitting the voltage ripple of the regulated output voltage of a regulator to be more fully adjustable over a continuous range of values, so that the voltage ripple may be more finely tailored to suit the requirements of various applications.

In accordance with these and other objects of the present invention, switching voltage regulator circuitry with an externally adjustable minimum peak inductor current level and hysteresis for Burst Mode is described. The circuitry can operate in either step-up (boost), step-down (buck), or buck-boost configurations in any regulator that utilizes Burst Mode operation.

One embodiment of the current invention incorporates a single pin that is used for selecting a mode of regulator operation (either forced continuous mode or Burst Mode), setting the burst threshold level during Burst Mode operation, and setting the burst comparator hysteresis during Burst Mode operation.

Another embodiment of the present invention provides an alternate method of implementing variable minimum peak inductor current level and burst comparator hysteresis through the use of two pins. One pin is used for selecting between forced continuous mode and Burst Mode, and another pin is used for setting the burst threshold level and burst comparator hysteresis during Burst Mode operation.

Another embodiment of the present invention provides another alternate method of implementing variable minimum peak inductor current level and burst comparator hysteresis through the use of three pins. One pin is used for selecting between forced continuous mode and Burst Mode, a second pin is used for setting the burst threshold level, and a third pin is used for setting the burst comparator hysteresis during Burst Mode operation.

The above preferred embodiments alleviate the problems associated with using a fixed minimum peak inductor current level and burst hysteresis. Accordingly, the present invention allows the output voltage ripple and efficiency of a switching regulator to be more fully adjustable to fit different application requirements. Furthermore, the present invention allows for large output voltage ripple without a loss of efficiency because an increase in hysteresis does not produce a corresponding increase in the magnitude of the current.

BRIEF DESCRIPTION OF THE DRAWINGS

The above and other advantages of the present invention will become apparent upon consideration of the following detailed description, taken in conjunction with the accompanying drawings, in which like reference characters refer to like parts throughout, and in which.

DETAILED DESCRIPTION OF THE INVENTION

Many electronic products use DC-DC switching regulators to convert an input voltage into a regulated output voltage that may be higher or lower than the input voltage. Switching regulators use one or more active switching devices, an inductor or transformer, and a capacitor to store and transfer the energy into the load.

Figure 1:
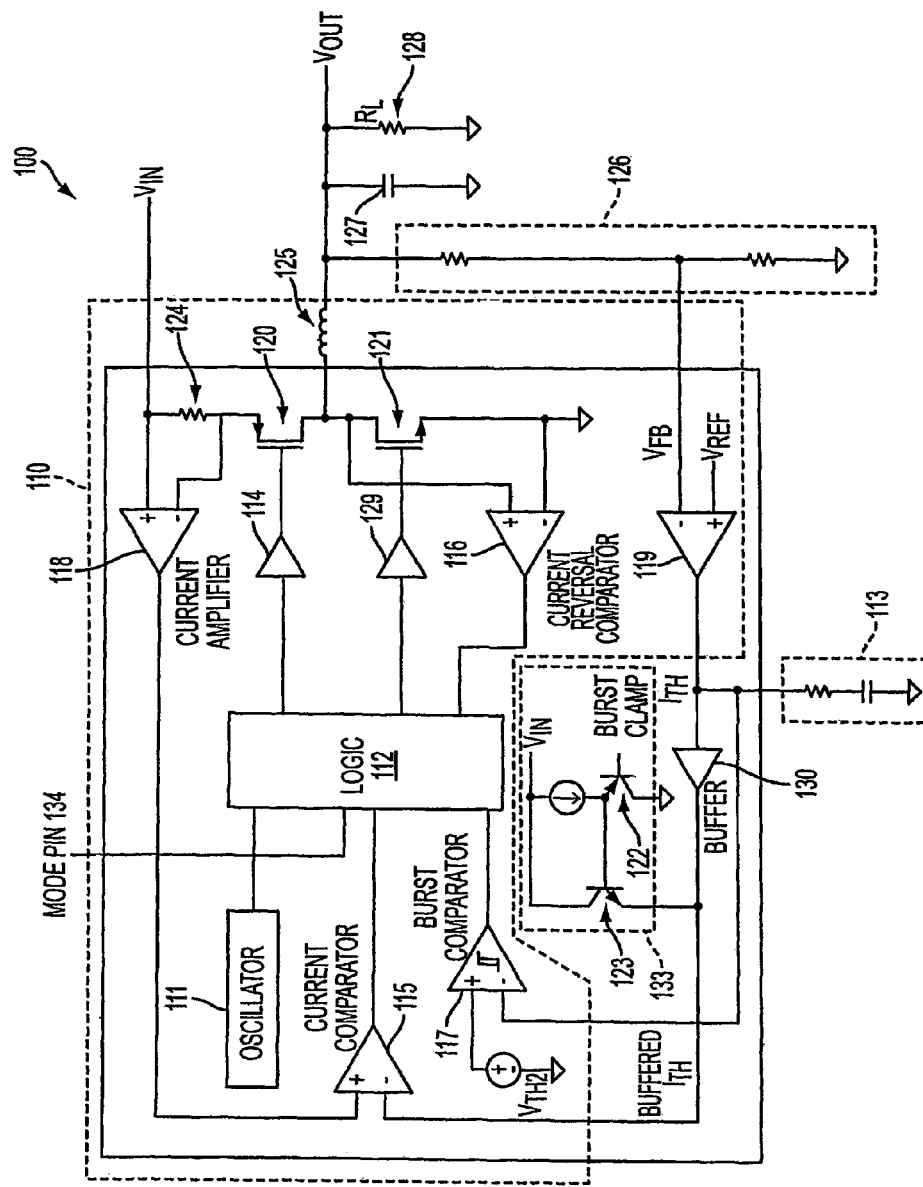
FIG. 1 is an illustrative circuit diagram of a conventional step-down switching voltage regulator.

FIG. 1 shows a conventional, step-down switching voltage regulator using a constant-frequency, current-mode control architecture. The circuit operates as follows.

Voltage regulator 100 of FIG. 1 comprises control circuitry 110, which incorporates oscillator 111 or any other suitable device which is capable of providing the circuit with switch timing (i.e., by generating a narrow pulse at a constant frequency). At the beginning of each cycle this oscillator pulse propagates through logic 112, which then directs main switch driver 114 to turn main switch 120 ON. Logic 112 may comprise a pulse-width modulator (PWM) circuit or any other suitable circuit capable of driving switch drivers 114 and 129 to control the duty cycle of main power switch 120 (i.e., the amount of time switch 120 is ON compared to the period of an ON/OFF cycle). This forces a voltage of approximately $V_{IN}$-$V_{OUT}$ across inductor 125. As a result, the current through inductor 125 increases linearly, and a greater amount of current is supplied to capacitor 127 and the load (modeled by resistor 128). When main switch 120 is ON, the inductor current flows through sense resistor 124 and develops a sense voltage across it that approximately is equal to the product of the inductor current and the sense resistor value. This voltage is then amplified by current amplifier 118. When the amplified sense voltage increases above the voltage on the inverting input of current comparator 115 (i.e., on the buffered $I_{TH}$ input), current comparator 115 trips and signals logic 112 to cause drivers 114 and 129 to turn main switch 120 OFF and synchronous switch 121 ON, respectively. This changes the voltage across inductor 125 to approximately $-V_{OUT}$, causing the inductor current to decrease until the next oscillator pulse once again turns main switch 120 ON and synchronous switch 121 OFF. It should be noted that although MOSFETs are used for the switching elements in this invention, any other type of suitable switching element may be used without departing from the principles of the present invention.

The voltage on the buffered $I_{TH}$ input controls the minimum peak inductor current at which current comparator 115 shuts main switch 120 OFF. Error amplifier 119, which may comprise a differential amplifier, a transconductance amplifier or any other suitable amplifier, adjusts the voltage on $I_{TH}$ by comparing the feedback signal from resistor divider 126 to a reference voltage $V_{REF}$. The $I_{TH}$ signal is then stabilized by compensation circuit 113, preferably comprising a resistor and a capacitor, and coupled to the inverting input of current comparator 115 through voltage buffer 130. If a large load step is applied to voltage regulator 100, the load current drawn from regulator 100 increases. This causes a reduction in the feedback voltage $V_{FB}$ relative to $V_{REF}$. Error amplifier 119 raises the $I_{TH}$ voltage until the average inductor current matches the new load current. Conversely, if the load current decreases, it causes an increase in the feedback voltage $V_{FB}$ relative to $V_{REF}$. This causes error amplifier 119 to decrease the $I_{TH}$ voltage. As a result, although main switch 121 continues to switch ON at the same frequency (i.e., at the beginning of each cycle), its duty cycle is decreased, and, therefore, it conducts less current as the load current decreases. This process continues until the average inductor current is equal to the new load current.

The regulator of FIG. 1 permits a user to select between two modes of operation for the switching regulator through use of external MODE selection input pin 134. The first mode of operation is forced continuous operation, which reduces noise, RF interference, and output voltage ripple. In forced continuous, the inductor current is allowed to become negative. When main switch 120 shuts OFF, synchronous switch 121 turns ON. The synchronous switch remains ON until the next oscillator pulse triggers the main switch to turn ON. The second mode of operation is Burst Mode, in which main switch 120 and synchronous switch 121 operate intermittently at light loads. This provides greater efficiency than forced continuous operation by reducing transistor gate charge losses at light loads.

In Burst Mode operation, current reversal comparator 116 is enabled and the inductor current is not allowed to become negative. The current reversal comparator monitors the current flowing through synchronous switch 121 and signals logic 112 to shut OFF the synchronous switch when the inductor current undergoes a current reversal condition. In the embodiment of FIG. 1, the current reversal condition indicates when current crosses the zero current level. However, one of ordinary skill in the art also will appreciate that the scope of the present invention includes other current reversal conditions, e.g., to indicate that current is about to or already has crossed the zero current level. For example, a voltage offset may be applied to the inverting input of comparator 116 so that comparator 116 trips right before the inductor or switch current crosses the zero current threshold.

During Burst Mode, transistors 122 and 123 of clamp circuitry 133 clamp the minimum value of the buffered $I_{TH}$ voltage at the burst threshold level, thereby setting the minimum peak inductor current level, $I_{burst}$. The $I_{TH}$ voltage then is monitored by burst comparator 117 to determine when sleep mode is enabled and disabled. When main switch 120 turns ON, the inductor current has to increase to minimum peak inductor current level $I_{burst}$ before it can shut OFF. Then, as the output load current drops, the peak inductor current decreases to keep the output voltage in regulation. When the load current demanded drops to a current less than $I_{burst}$ minus half of the ripple current in the inductor, the burst threshold forces the peak inductor current to remain equal to $I_{burst}$. Since the average inductor current is greater than the load current, error amplifier 119 reduces the $I_{TH}$ voltage until burst comparator 117 trips. When the burst comparator trips, sleep mode is enabled and both switches 120 and 121, along with predetermined components of the remaining circuitry, are shut OFF to reduce power consumption. At this point, the load current is solely supplied by output capacitor 127. When the output voltage drops, the voltage on $I_{TH}$ increases above a level that is set by the hysteresis of burst comparator 117 and untrips burst comparator 117. Sleep mode is de-asserted, all circuitry is turned ON, and normal operation is resumed.

A disadvantage of the circuit in FIG. 1 is that the burst threshold level (or burst clamp level) and burst comparator hysteresis are fixed internally within the switching regulator. Because the burst clamp fixes the minimum peak inductor current during every switching cycle and the burst comparator hysteresis fixes the period in which the regulator operates in sleep mode, the output voltage ripple is also fixed. For higher burst clamp levels and wider burst hysteresis, the efficiency at light loads is higher at the expense of higher output voltage ripple. For lower burst clamp levels and narrower hysteresis, the output voltage ripple is lower at the expense of slightly reduced efficiency for light loads. Because the burst clamp level and burst comparator hysteresis are fixed internally, the output voltage ripple and efficiency cannot be tailored to fit different application requirements.

Figure 2:
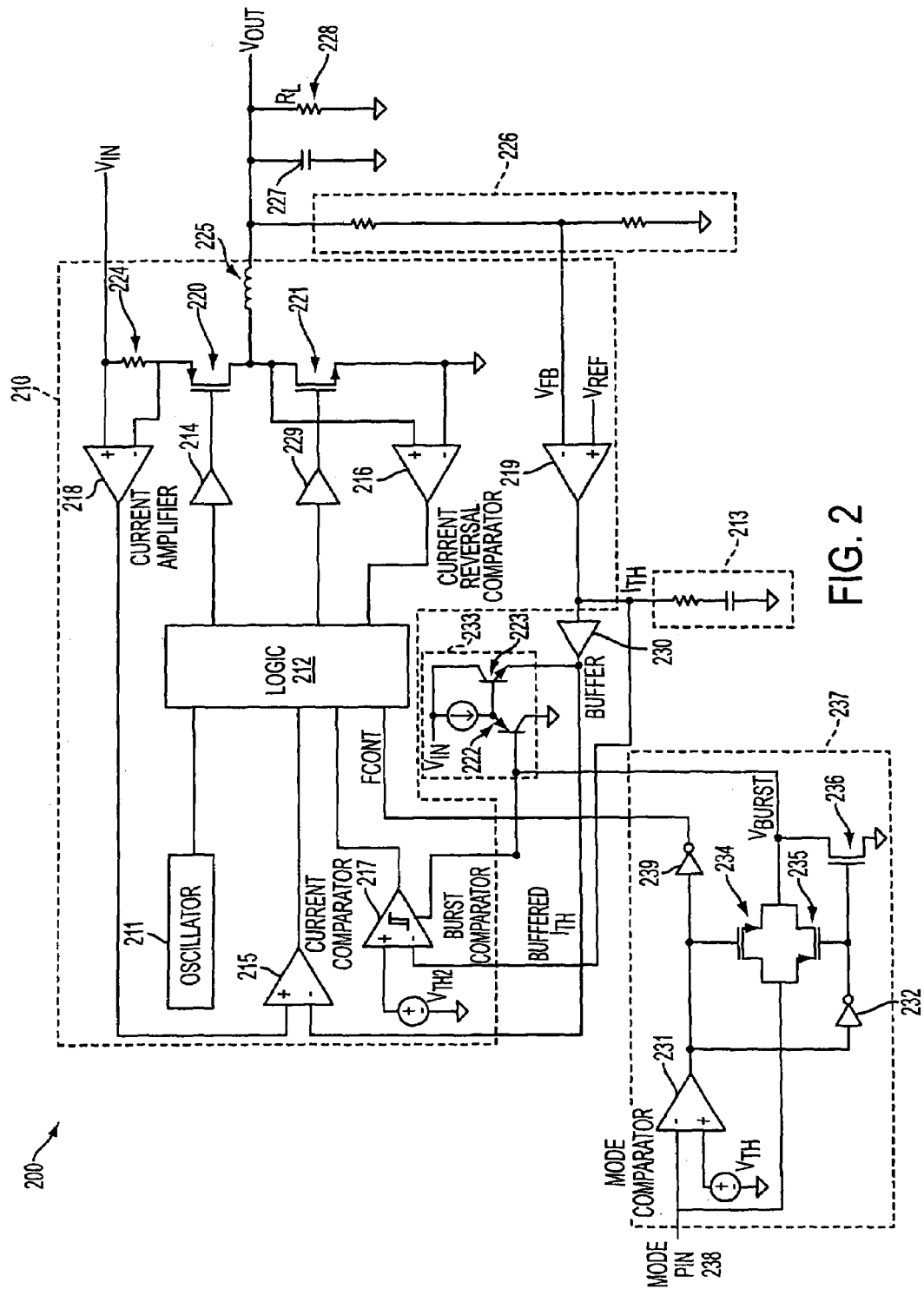
FIG. 2 is an illustrative circuit diagram of an embodiment of a step-down switching voltage regulator with an adjustable minimum peak inductor current level and an adjustable burst comparator hysteresis in accordance with the principles of the present invention.

FIG. 2 shows an embodiment of a step-down switching voltage regulator with an adjustable minimum peak inductor current level and an adjustable burst comparator hysteresis according to the principles of the present invention. The aforementioned limitation of conventional regulators operating in Burst Mode is overcome by the present invention in the following manner. The regulator in FIG. 2 preferably incorporates a single external pin for the purpose of permitting a user to select the mode of operation (either Burst Mode or forced continuous mode) as well as set the burst threshold level and burst hysteresis of switching regulator 200 during Burst Mode.

Operating under forced continuous mode, FIG. 2 functions as follows. Oscillator 211 provides the switch timing mechanism, turning main switch 220 ON and synchronous switch 221 OFF at the beginning of each cycle. A sense voltage resulting from the inductor current flowing through resistor 224 is amplified by current amplifier 218, the output of which is used as one of the inputs to current comparator 215. Error amplifier 219 compares a feedback voltage with a reference voltage to raise or lower the $I_{TH}$ voltage as necessary. The buffered $I_{TH}$ voltage provides the second input to current comparator 215, which serves to signal main switch 220 to be turned OFF when the inductor current increases to a level that is greater than the current level set by the buffered $I_{TH}$ signal. While control circuit 210 of FIG. 2 indicates that output $I_{TH}$ of error amplifier 219 is buffered by buffer 230 before being transmitted to current comparator 215, one of ordinary skill in the art will understand that buffer 230 is optional (see, e.g., control circuit 510 of FIG. 5). As used herein, both signal $I_{TH}$ and buffered $I_{TH}$ both are considered an output signal of the error amplifier.

In FIG. 2, the FCONT signal is used to tell logic 212 whether the switching regulator should operate in forced continuous or in Burst Mode. When FCONT is a logic HIGH, the mode of operation is forced continuous. When FCONT is a logic LOW, the mode of operation is Burst Mode. Voltage $V_{Burst}$ is used to set the burst threshold level of burst clamp 233 and the burst comparator hysteresis of burst comparator 217. When $V_{Burst}$ is set at zero Volts, the minimum peak inductor current level and burst hysteresis will be set at their minimum values. As the value of $V_{Burst}$ is raised, the minimum peak inductor current level and burst hysteresis will increase linearly as a function of $V_{Burst}$. One of ordinary skill in the art will understand that, while the minimum peak inductor current level and burst hysteresis of the embodiment of FIG. 2 increase linearly as a function of $V_{Burst}$, it is within the scope of the present invention for either one or both to increase non-linearly as a function of $V_{Burst}$. See the discussion of FIG. 3 for a detailed explanation of how hysteresis is adjusted in the burst comparator.

Mode comparator 231, a transmission gate comprising transistors 234 and 235, transistor 236, and inverters 232 and 239 comprise mode selection circuitry 237. When the voltage at MODE selection input pin 238 is above threshold voltage $V_{TH}$, the output of mode comparator 231 is LOW. This causes the output of inverter 239 to make the signal at FCONT a logic HIGH. A LOW logic signal at the output of mode comparator 231 also shuts off NMOS transistor 234 and PMOS transistor 235. The gate of NMOS transistor 236 is also driven HIGH to bring the burst threshold level to 0 Volts.

When the voltage at MODE selection input pin 238 is less than threshold voltage $V_{TH}$, the output of mode comparator 231 is HIGH. This causes the output of inverter 239 to make the signal at FCONT a logic LOW. In this state, NMOS transistor 234 and PMOS transistor 235 are turned ON and NMOS transistor 236 is turned OFF. Because the transmission gate is turned ON, voltage $V_{Burst}$ will be substantially equivalent to the voltage at MODE selection input pin 238. During Burst Mode, the voltage at MODE selection input pin 238 can be varied to adjust the burst threshold level and burst comparator hysteresis to a desired level. This gives the user the ability to set the amplitude and frequency of the output voltage ripple as well as the efficiency during light loads to satisfy different applications with different requirements. This may be important in applications where it is important to keep the switching frequency out of the audible band or where the voltage ripple of traditional Burst Mode converters cannot be tolerated. Furthermore, the user may set the output voltage ripple to be large without a loss of efficiency, because the current is not affected by a change in hysteresis, and therefore efficiency loss due to conduction losses is reduced.

In order to achieve a compromise between low output voltage ripple and efficiency, it also is possible to produce pulse skipping behavior while in Burst Mode. This can be accomplished by connecting the MODE selection input pin to ground. This sets the burst threshold level to 0 Volts, and sets $I_{burst}$ to 0 Amps. In this condition, the peak inductor current is limited by the minimum on-time of the current comparator. If the load demand is less than the average of the minimum on-time inductor current, switching cycles will be skipped to keep the output voltage in regulation.

Figure 3:
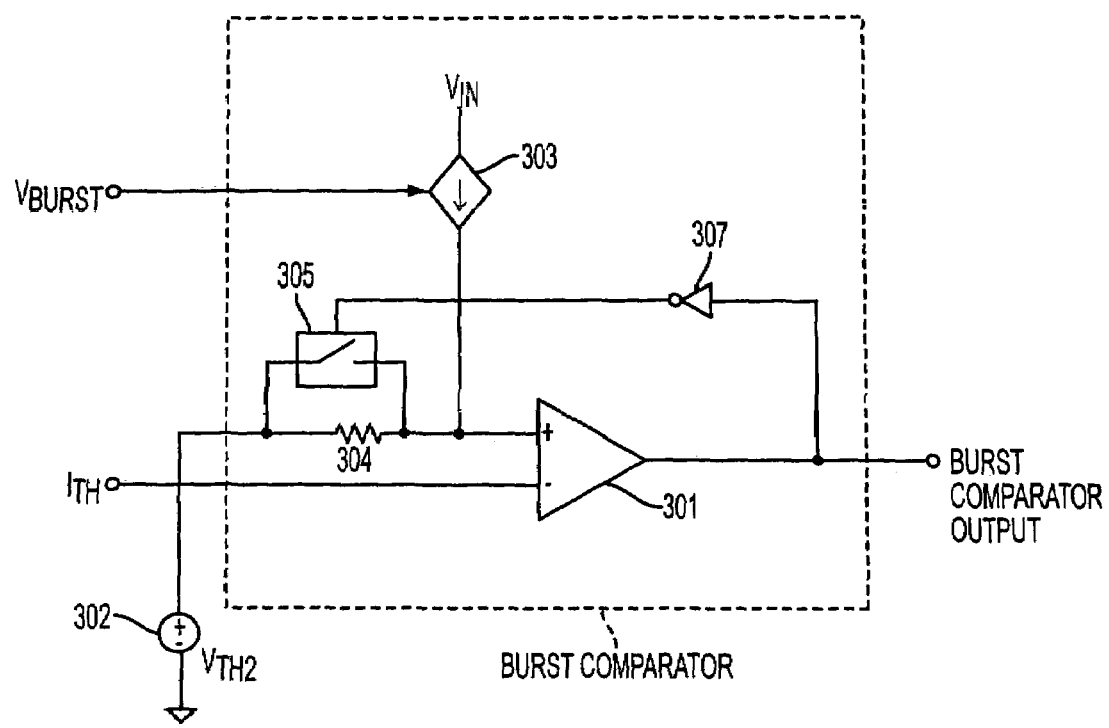
FIG. 3 is an illustrative circuit diagram of an embodiment of the burst comparator shown in FIGS. 2 and 4-8.

FIG. 3 illustrates in greater detail how the hysteresis is added and adjusted in burst comparator 217 of FIG. 2. In particular, the $I_{TH}$ signal output by error amplifier 219 is coupled to the inverting input of comparator 301. This voltage is compared against the burst comparator threshold level at the non-inverting input of comparator 301, which includes the sum of threshold voltage $V_{TH2}$ and the voltage across resistor 304 (when the latter is greater than zero volts as described in greater detail below). The voltage across resistor 304 sets the hysteresis level and is controlled by voltage-controlled current source 303. The $V_{Burst}$ signal from mode selection circuitry 237 controls the current amplitude of voltage-controlled current source 303 and allows the hysteresis to be varied proportional to the voltage level of $V_{Burst}$.

During normal regulator operation, when the voltage of $I_{TH}$ is greater than $V_{TH2}$, the output of comparator 301 is LOW. Inverter 307 inverts the LOW signal, causing switch 305 to short resistor 304. In a preferred embodiment, switch 305 comprises a transistor. When resistor 304 is shorted, the reference voltage at the non-inverting input of comparator 301 or the burst comparator threshold level is supplied only by voltage source 302. When the voltage at $I_{TH}$ decreases below $V_{TH2}$, the output of comparator 301 transitions to HIGH, causing sleep mode to be enabled, and switch 305 shuts OFF. This causes the voltage at the non-inverting input of comparator 301 to increase to $V_{TH2}$ plus the voltage across resistor 304. In other words, hysteresis is added. Since the voltage across resistor 304 is a function of $V_{Burst}$, which in turn is set by a user, the user effectively controls the hysteresis of the burst comparator. When the $I_{TH}$ voltage increases above that of the new burst comparator threshold level (that is, $V_{TH2}$ plus the voltage across resistor 304), comparator 301 outputs a LOW signal, causing sleep mode to be de-asserted and resistor 304 to be shorted.

One skilled in the art would understand that the circuit shown in FIG. 3 illustrates only one way of adding and adjusting hysteresis in a comparator. Other hysteretic comparators known in the art or otherwise also may be employed. Furthermore, although the burst comparator of FIG. 3 was described with respect to control circuit 210 of FIG. 2, the hysteretic burst comparators of FIGS. 4-8 also may operate similarly.

Figure 4:
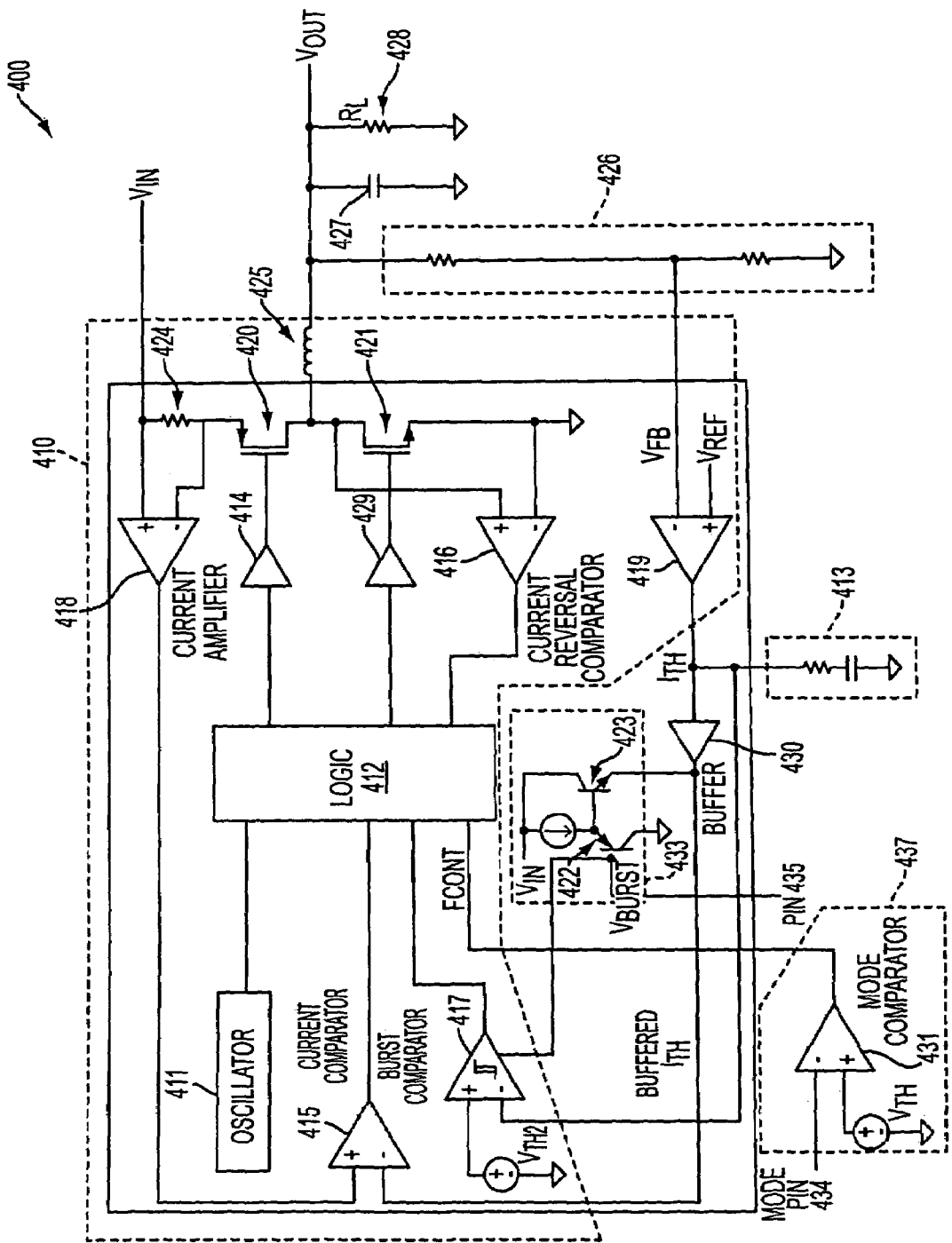
FIG. 4 is an illustrative circuit diagram of an alternate embodiment of a step-down switching voltage regulator with an adjustable minimum peak inductor current level and an adjustable burst comparator hysteresis in accordance with the principles of the present invention.

Another embodiment of the present invention is shown in FIG. 4, wherein two pins are used to implement a variable burst threshold level and burst comparator hysteresis for Burst Mode. The regulator shown in FIG. 4 functions similarly to that shown in FIG. 2, except for the portion of the circuit responsible for controlling whether the regulator operates in forced continuous mode or Burst Mode, as well as setting the burst threshold level and burst comparator hysteresis during Burst Mode operation.

When a voltage above threshold voltage $V_{TH}$ is applied at MODE selection input pin 434 to mode comparator 431 of mode selection circuitry 437, the output of mode comparator 431 is LOW. This signal travels to logic 412 and causes the regulator to operate in forced continuous mode. Alternatively, if the voltage applied at MODE selection input pin 434 is less than $V_{TH}$, the output of mode comparator 431 is HIGH and the regulator operates in Burst Mode.

Pin 435 (i.e., the $V_{BURST}$ selection input) in FIG. 4 provides an external user-accessible connection to burst clamp circuitry 433 and burst comparator 417 for the user to set the burst threshold level and burst comparator hysteresis (respectively) as described above with respect to FIGS. 2-3. In this manner, when the signal applied at MODE selection input pin 434 causes the regulator to operate in Burst Mode, the burst threshold level and the burst comparator hysteresis can be adjusted independently of the signal applied at MODE selection input pin 434 in order to manipulate the minimum peak inductor current level and the burst comparator hysteresis. Once again, this provides a substantial improvement over the prior art, allowing the user to better tune the output voltage ripple and efficiency of regulator 400 to meet the requirements of a specific application. Furthermore, the present invention allows for larger output voltage ripples without a loss of efficiency, because the amplitude of the output current is not affected by a change in hysteresis.

The remaining elements in FIG. 4 perform substantially the same purpose as the corresponding elements described above with reference to FIG. 2.

Figure 5:
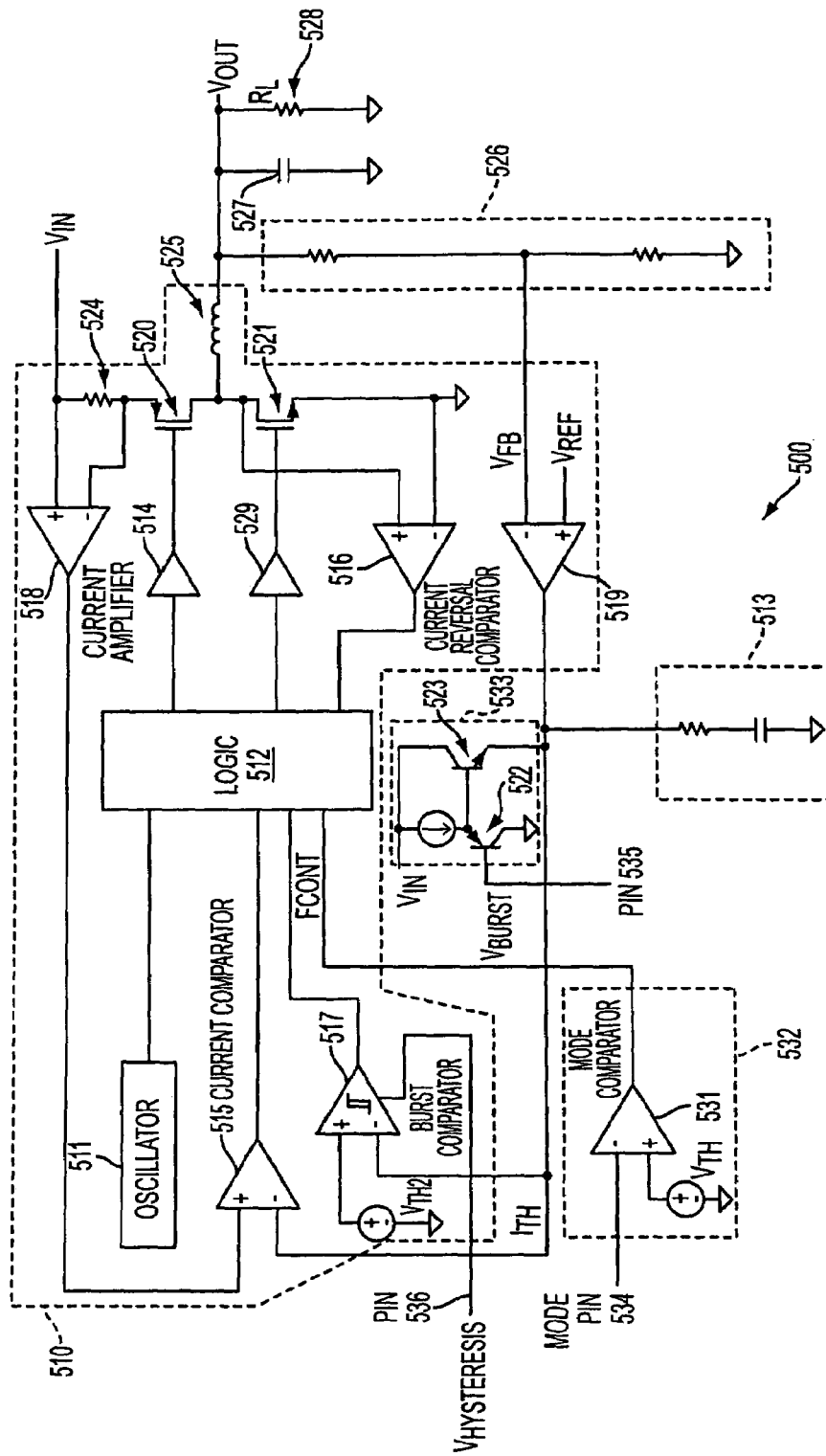
FIG. 5 is an illustrative circuit diagram of another alternate embodiment of a step-down switching voltage regulator with an adjustable minimum peak inductor current level and an adjustable burst comparator hysteresis in accordance with the principles of the present invention.

Another embodiment of the present invention is shown in FIG. 5, wherein three pins are used to implement a variable burst threshold level and a variable burst comparator hysteresis for Burst Mode. The regulator shown in FIG. 5 functions similarly to that shown in FIG. 2, except for the portion of the circuit responsible for controlling whether the regulator operates in forced continuous mode or Burst Mode, as well as setting the burst threshold level and burst comparator hysteresis during Burst Mode operation.

When a voltage above threshold voltage $V_{TH}$ is applied at MODE selection input pin 534 to mode comparator 531 of mode selection circuitry 532, the output of mode comparator 531 is LOW. This signal travels to logic 512 and causes the regulator to operate in forced continuous mode. Alternatively, if the voltage applied at MODE selection input pin 534 is less than $V_{TH}$, the output of mode comparator 531 is HIGH and the regulator operates in Burst Mode.

Pin 535 in FIG. 5 (i.e., the $V_{BURST}$ selection input) provides an external user-accessible connection to burst clamp circuitry 533 for the user to set the burst threshold level. In this manner, when the signal applied at MODE selection input pin 534 causes the regulator to operate in Burst Mode, the burst threshold level can be adjusted by a user via pin 535 in order to manipulate the minimum peak inductor current level for Burst Mode as described above with respect to FIGS. 2-3. Once again, this provides a substantial improvement over the prior art, allowing the user to better tune the output voltage ripple and efficiency of regulator 500 to meet the requirements of a specific application. Furthermore, the present invention allows for larger output voltage ripples without a loss of efficiency, because the amplitude of the output current is not affected by a change in hysteresis.

Pin 536 in FIG. 5 (i.e., the $V_{HYSTERESIS}$ selection input) provides an external user-accessible connection to burst comparator 517 for the user to set the burst comparator hysteresis. In this manner, when the signal applied at MODE selection input pin 534 causes the regulator to operate in Burst Mode, the burst comparator hysteresis can be adjusted by a user via pin 536 in order to manipulate the hysteresis for Burst Mode as described above with respect to FIGS. 2-3. Once again, this provides a substantial improvement over the prior art, allowing the user to better tune the output voltage ripple and efficiency of regulator 500 to meet the requirements of a specific application. Furthermore, the present invention allows for larger output voltage ripples without a loss of efficiency, because the amplitude of the output current is not affected by a change in hysteresis.

The remaining elements in FIG. 5 perform substantially the same purpose as the corresponding elements described above with reference to FIG. 2.

It should be noted that, although FIGS. 2, 4, and 5 each show step-down synchronous switching regulator embodiments, the present invention is not limited in this regard. The benefits of the present invention are equally applicable to other types of regulators, such as step-up synchronous switching regulators, step-up and step-down non-synchronous switching regulators, or any other suitable type of regulator.

Figure 6:
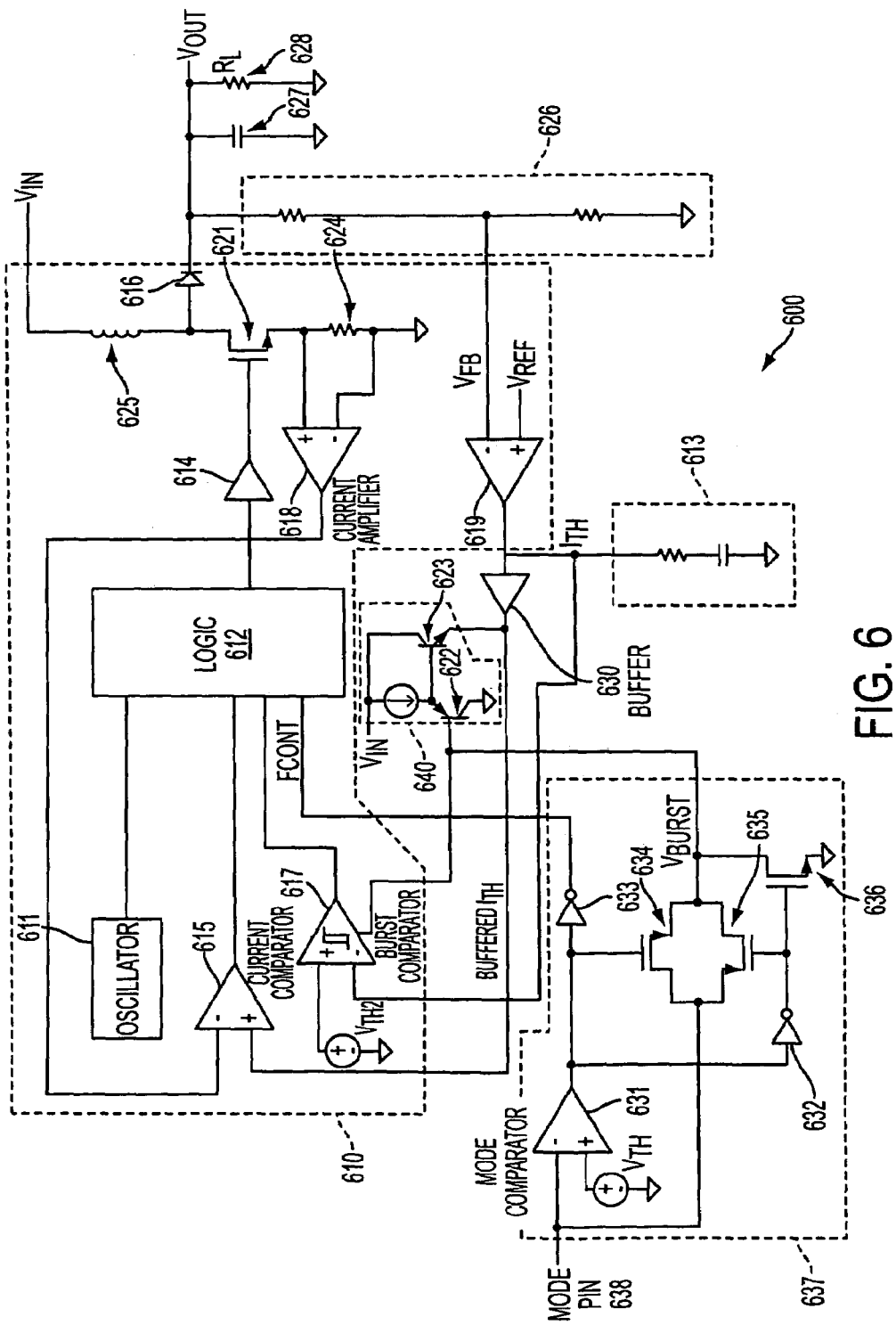
FIG. 6 is an illustrative circuit diagram of an embodiment of a step-up switching voltage regulator with an adjustable minimum peak inductor current level and an adjustable burst comparator hysteresis in accordance with the principles of the present invention.

FIG. 6 is a circuit diagram of an exemplary embodiment of a step-up switching voltage regulator with an adjustable minimum peak inductor current level and an adjustable burst hysteresis for Burst Mode in accordance with the principles of the present invention. FIG. 6 employs many of the same elements that are present in the step-down regulator shown in FIG. 2. It also utilizes diode 616 to prevent capacitor 627 from discharging to ground. Control circuit 610 of step-up regulator 600 shown in FIG. 6 functions as described below.

When circuit conditions cause main switch 621 to close, the input voltage is applied across inductor 625. During this charge phase, current begins to flow through inductor 625, diode 616 prevents capacitor 627 from discharging to ground, and capacitor 627 is responsible for supplying the load with current.

Once switch 621 opens, capacitor 627 is charged by the energy stored in inductor 625. At this time, an extra current starts flowing through the load, thereby causing the output voltage to rise (energy also is supplied directly from the input source as long as diode 616 is forward biased). After some time period, switch 621 is once again closed. This cycle repeats itself, maintaining the required output voltage level and supplying the required current to the load as necessary.

The remainder of the circuit components in FIG. 6 behave as previously explained for the comparable circuit components found in FIG. 2. Current comparator 615 compares the outputs from current amplifier 618 and error amplifier 619 in order to determine when main switch 621 should be turned OFF.

Furthermore, the input signal to MODE selection input 638 determines whether regulator 600 operates in forced continuous mode or Burst Mode, and also sets the burst threshold level and burst hysteresis when Burst Mode is selected. Mode comparator 631, a transmission gate comprising transistors 634 and 635, transistor 636, and inverters 632 and 633 comprise mode selection circuitry 637. Mode selection circuitry 637 provides the signals at FCONT and $V_{BURST}$, which respectively determine the mode of operation of regulator 600 and (when appropriate) the burst threshold level and burst comparator hysteresis. As shown in FIG. 6, mode comparator 631 compares the signal on MODE selection input 638 with threshold voltage $V_{TH}$. When the voltage at MODE selection input pin 638 is above $V_{TH}$, the output of mode comparator 631 is LOW. This, in turn, causes the output of inverter 633 to make the signal at FCONT a logic HIGH, causing the regulator to operate in forced continuous mode. In addition, the LOW output of mode comparator 631 also shuts OFF n-channel transistor 634 and p-channel transistor 635, and drives the gate of n-channel transistor 636 HIGH to bring the burst threshold level to 0 Volts.

Alternatively, when the voltage at the MODE selection input is less than $V_{TH}$, the output of mode comparator 631 becomes HIGH. In this case, the output of inverter 633 makes the signal at FCONT a logic LOW, thereby bringing the regulator into Burst Mode. In this state, the transmission gate comprising n-channel transistor 634 and p-channel transistor 635 is turned ON (both transistors are ON) and n-channel transistor 636 is turned OFF. As a result, $V_{BURST}$ becomes substantially equivalent to the voltage being applied at the MODE selection input. The voltage at MODE selection input pin 638 may be varied during Burst Mode to adjust the burst threshold level and burst comparator hysteresis as described above with respect to FIGS. 2-3. In this manner, it is possible to adjust the minimum peak inductor current level and burst comparator hysteresis as necessary in order to tailor the output voltage ripple and efficiency of regulator 600 as desired. Furthermore, a larger output voltage ripple than prior regulators can be used without a loss of efficiency, because the current is not affected by a change in hysteresis.

Figure 7:
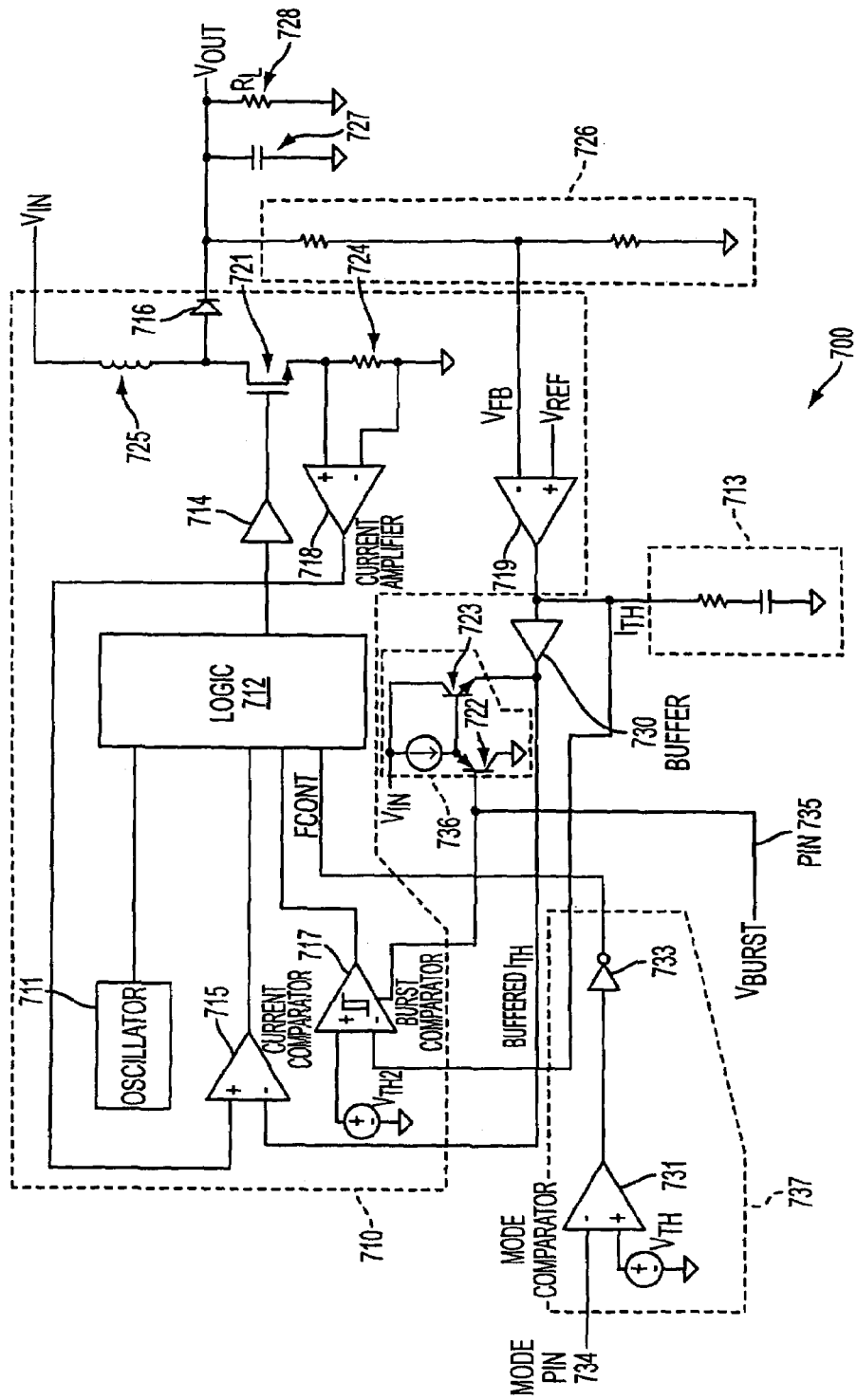
FIG. 7 is an illustrative circuit diagram of an alternate embodiment of a step-up switching voltage regulator with an adjustable minimum peak inductor current level and an adjustable burst comparator hysteresis in accordance with the principles of the present invention.

Another embodiment of a step-up switching voltage regulator with an adjustable minimum peak inductor current level and burst comparator hysteresis is shown in FIG. 7. The majority of the circuit shown in FIG. 7 operates similarly to the circuit shown in FIG. 6 as described above. In accordance with the principles of the present invention, FIG. 7 shows two pins that respectively are used for (1) selecting the regulator operating mode and (2) setting the burst threshold level and burst comparator hysteresis.

The operation of regulator 700, in either forced continuous mode or Burst Mode, is selected by supplying a voltage at MODE selection input 734. If a voltage above the threshold voltage $V_{TH}$ is applied at MODE selection input 734, the output of mode comparator 731 is LOW, and, therefore, the output of inverter 733 (i.e., the signal at FCONT) is HIGH. This causes regulator 700 to operate in forced continuous mode. Alternatively, if the voltage applied at the MODE selection input is less than $V_{TH}$, the signal at FCONT is LOW and the regulator operates in Burst Mode.

Pin 735 (i.e., the $V_{BURST}$ selection input) shown in FIG. 7 provides a user with the ability to set the burst threshold level and burst comparator hysteresis. When the signal applied at MODE selection input 734 causes the regulator to operate in Burst Mode, the burst threshold level and burst hysteresis may be adjusted through the use of the $V_{BURST}$ selection input as described above with respect to FIGS. 2-6. In this manner, it is possible to control the minimum peak inductor current level and the period during which a regulator operates in sleep mode.

The remaining elements in FIG. 7 perform substantially the same purpose as the corresponding elements described above with reference to FIG. 6.

Figure 8:
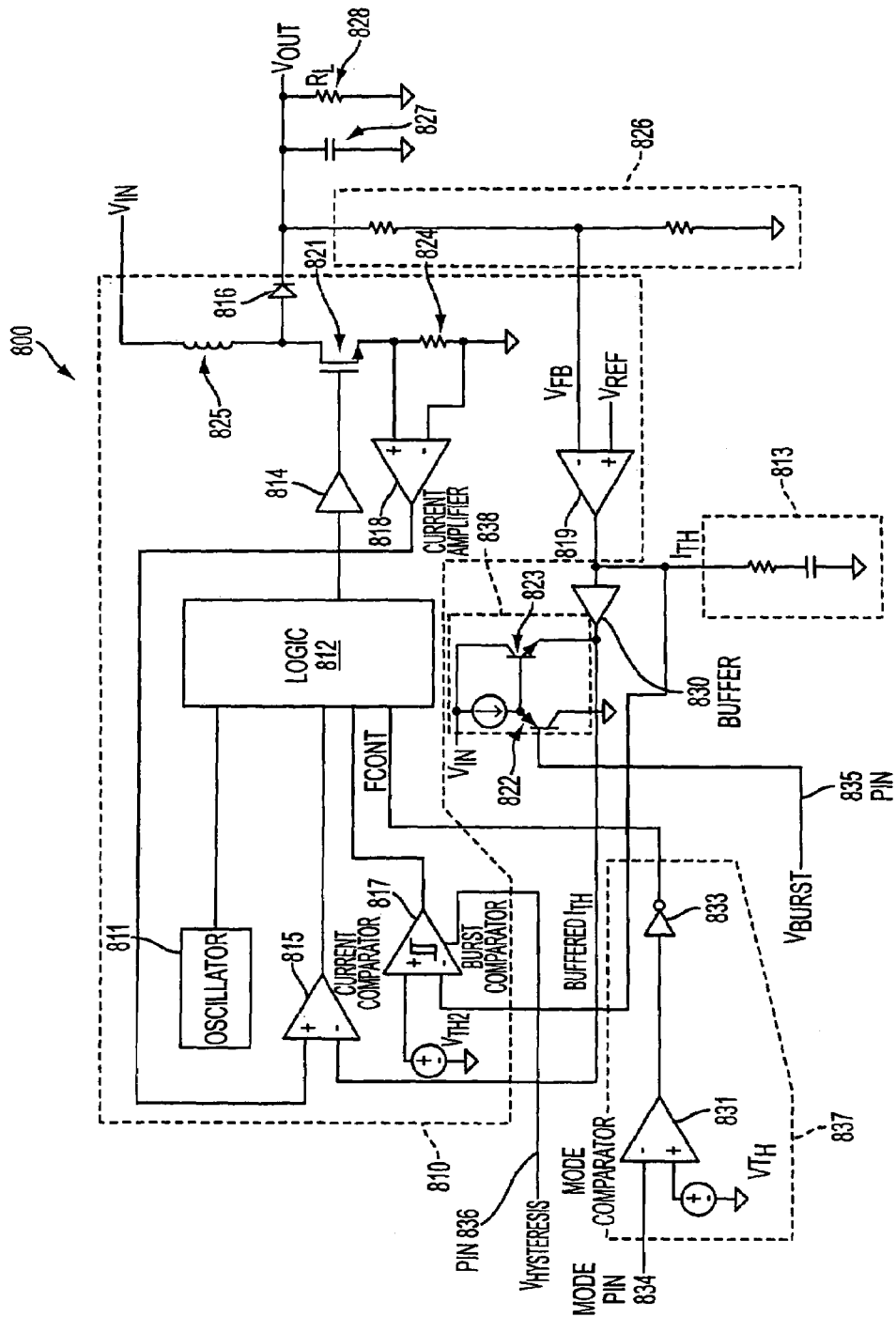
FIG. 8 is an illustrative circuit diagram of another alternate embodiment of a step-up switching voltage regulator with an adjustable minimum peak inductor current level and an adjustable burst comparator hysteresis in accordance with the principles of the present invention.

Another embodiment of a step-up switching voltage regulator with an adjustable minimum peak inductor current level and burst comparator hysteresis is shown in FIG. 8. The majority of the circuit shown in FIG. 8 operates similarly to the circuit shown in FIG. 6 as described above. In accordance with the principles of the present invention, FIG. 8 shows three pins that respectively are used for (1) the selection of the regulator operating mode, (2) setting the burst threshold level, and (3) setting the burst comparator hysteresis.

The operation of regulator 800, in either forced continuous mode or Burst Mode, is selected by supplying a voltage at MODE selection input pin 834. If a voltage above the threshold voltage $V_{TH}$ is applied at MODE selection input 834, the output of mode comparator 831 is LOW, and, therefore, the output of inverter 833 (i.e., the signal at FCONT) is HIGH. This causes regulator 800 to operate in forced continuous mode. Alternatively, if the voltage applied at the MODE selection input is less than $V_{TH}$, the signal at FCONT is LOW and the regulator operates in Burst Mode.

Pin 835 (i.e., the $V_{BURST}$ selection input) provides a user with the ability to set the burst threshold level. When the signal applied at the MODE selection input causes the regulator to operate in Burst Mode, the burst threshold level may be adjusted through the use of the $V_{BURST}$ selection input as described above with respect to FIGS. 2-6. In this manner, it is possible to control the minimum peak inductor current level.

Pin 836 (i.e., the $V_{HYSTERESIS}$ selection input) provides a user with the ability to set the burst comparator hysteresis. When the signal applied at the MODE selection input causes the regulator to operate in Burst Mode, the burst hysteresis may be adjusted through the use of the $V_{HYSTERESIS}$ selection input as described above with respect to FIGS. 2-6. In this manner, it is possible to control the period between burst cycles.

The remaining elements in FIG. 8 perform substantially the same purpose as the corresponding elements described above with reference to FIG. 6.

Figure 9:
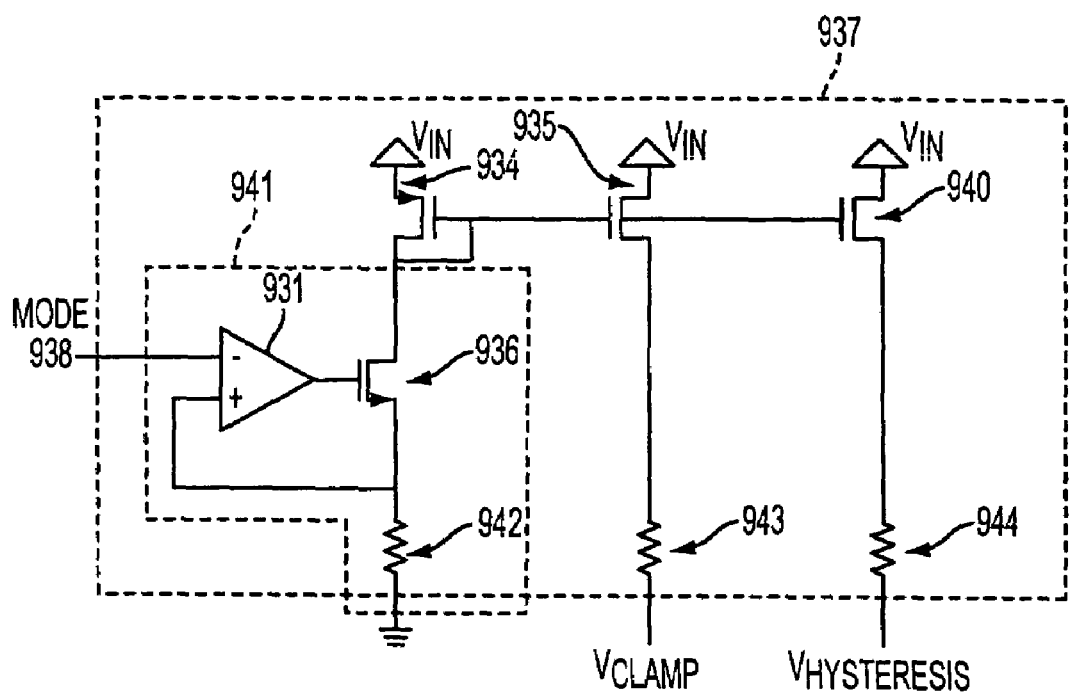
FIG. 9 is an illustrative circuit diagram of an alternative embodiment of the mode selection circuitry shown in FIGS. 2 and 4-8.

Another embodiment of the mode selection circuitry described above with respect to FIGS. 2 and 6 is shown in FIG. 9. Voltage comparator 931, transistors 934, 935, 936, and 940, and resistors 942, 943, and 944 comprise one embodiment of mode selection circuitry 937.

In the embodiment shown in FIG. 9, the voltage at MODE selection input pin 938 is converted into a current by voltage to current conversion circuitry 941, comprising voltage comparator 931, transistor 936, and resistor 942. Transistors 934 and 935 act as a current mirror, causing a current proportional to that flowing through transistors 934 and 936 and resistor 942 to flow through resistor 943 and transistor 935. The resulting output voltage $V_{CLAMP}$ is transmitted to the burst clamp of the regulator to serve as the burst threshold level and thereby control the minimum peak inductor current as described above. Similarly, transistors 934 and 940 also act as a current mirror, causing a current proportional to that flowing through transistors 934 and 936 and resistor 942 to flow through resistor 944 and transistor 940. The resulting output voltage $V_{HYSTERESIS}$ is transmitted to the burst comparator of the regulator to control voltage-controlled current source 303 as described above with respect to FIG. 3. This embodiment has the advantage of being able to individually scale the voltages sent to the burst clamp and the burst comparator during Burst Mode by altering the resistance values of resistors 942, 943, and 944 and/or sizes of transistors 934, 935, and 940. This allows for greater user flexibility in setting the burst threshold level and burst comparator hysteresis, which are controlled by $V_{CLAMP}$ and $V_{HYSTERESIS}$ respectively, to satisfy different applications with different requirements. Although FIG. 9 illustrates current mirrors that operate using MOSFETs, one of ordinary skill in the art will recognize that any other type of current mirrors known in the art, such as current mirrors using bipolar transistors, or otherwise can be substituted in accordance with the principles of the present invention.

It should be noted that although FIGS. 2-9 each show a particular embodiment of a regulator in accordance with the principles of the present invention, the present invention is not limited in any way in this respect. The principles of the present invention may be applied to any type of regulator (e.g., step-up synchronous switching voltage regulator), and the benefits of doing so should be understood by one skilled in the art. Moreover, it should be known by one skilled in the art that the circuitry used to set the burst threshold level and burst hysteresis in accordance with the principles of the present invention, as described above, is only exemplary and the present invention is not limited in this manner. It should also be known by one skilled in the art that, although the embodiments described in FIGS. 2 and 4-9 permit both the burst threshold level and the burst hysteresis to be adjusted by a user, a regulator that permits a user to adjust only the burst hysteresis (while keeping a fixed burst clamp) has many of the same benefits of being able to trade off voltage ripple and efficiency in accordance with the principles of the present invention.

What is claimed is:

1. A switching regulator that supplies output current at a regulated voltage to a load, said switching regulator being capable of operating in Burst Mode, said switching regulator comprising:
    an input terminal;
    an output terminal coupled to said load;
    a control circuit coupled to said input and output terminals, said control circuit regulating the current supplied to said load; and
    an adjustment circuit coupled to said control circuit for enabling a user to set a burst threshold level and a hysteresis of said switching regulator when said switching regulator operates in Burst Mode.

2. The switching regulator of claim 1 wherein said switching regulator is a step-down regulator.

3. The switching regulator of claim 1 wherein said switching regulator is a non-synchronous switching regulator.

4. The switching regulator of claim 1 wherein said switching regulator is a synchronous switching regulator.

5. The switching regulator of claim 1 wherein said control circuit comprises:
    a logic section;
    an inductor; and
    a main switch coupled to said logic section, said main switch controlled by said logic section.

6. The switching regulator of claim 5 wherein said control circuit further comprises an oscillator coupled to said logic section, said oscillator providing an oscillatory signal to said logic section.

7. The switching regulator of claim 5 wherein said control circuit further comprises an error amplifier coupled to said output terminal, said error amplifier having an error amplifier output signal and said error amplifier adjusting said error amplifier output signal depending on load conditions.

8. The switching regulator of claim 7 wherein said control circuit further comprises:
    a current comparator coupled to said logic section, said current comparator producing a current comparator signal that instructs said logic section to turn OFF said main switch when a sense signal compares in a predetermined manner with said error amplifier output signal; and
    a current amplifier coupled to said current comparator, said current amplifier providing said current comparator with said sense signal indicative of the current flowing through said inductor.

9. The switching regulator of claim 7 wherein said control circuit further comprises a burst comparator coupled to said logic section, said burst comparator producing a burst comparator signal that causes said switching regulator to enter into sleep mode when said error amplifier output signal crosses a level that trips said burst comparator.

10. The switching regulator of claim 5 wherein said control circuit further comprises a synchronous switch coupled to said logic section and to said main switch, said synchronous switch switching in opposition to said main switch.

11. The switching regulator of claim 10 wherein said control circuit further comprises a current reversal comparator coupled to said logic section, said current reversal comparator producing a current reversal comparator signal when said switching regulator operates in Burst Mode that causes said logic section to turn OFF said synchronous switch when current through said synchronous switch undergoes a current reversal condition.

12. The switching regulator of claim 5 wherein said adjustment circuit comprises:
   a mode selection input pin through which the user may select a mode of operation for said switching regulator and set said burst threshold level;
   a mode comparator that receives a mode selection signal from said mode selection input pin, said mode comparator providing a mode comparator output signal indicative of said mode selection signal, wherein said mode comparator output signal is supplied to said logic section; and
   a transmission gate comprising transistors, said transmission gate coupled to said mode selection input pin and to a clamping circuit, said transmission gate receiving signals dependent on said mode comparator output signal, said transmission gate providing said clamping circuit with said burst threshold level when said switching regulator is operating in Burst Mode.

13. The switching regulator of claim 12, wherein said transmission gate further is coupled to a burst comparator, said transmission gate providing said burst comparator with a signal related to said mode selection signal from said mode selection input pin to set said hysteresis when said switching regulator is operating in Burst Mode.

14. The switching regulator of claim 5 wherein said adjustment circuit comprises:
   a mode selection input pin through which the user may select a mode of operation for said switching regulator, said mode selection input pin providing a mode selection signal;
   a mode comparator that receives said mode selection signal, said mode comparator providing a mode comparator output signal indicative of said mode selection signal, said mode comparator output signal supplied to said logic section; and
   a burst threshold level and hysteresis selection pin through which the user may set said burst threshold level and said hysteresis of said switching regulator when said switching regulator operates in Burst Mode, said burst threshold level and hysteresis selection pin coupled to a clamping circuit.

15. The switching regulator of claim 5 wherein said adjustment circuit comprises:
   a mode selection input pin through which the user may select a mode of operation for said switching regulator, said mode selection input pin providing a mode selection signal;
   a mode comparator that receives said mode selection signal, said mode comparator providing a mode comparator output signal indicative of said mode selection signal, said mode comparator output signal supplied to said logic section;
   a burst threshold level selection pin through which the user may set said burst threshold level of said switching regulator when said switching regulator operates in Burst Mode; and
   a burst hysteresis selection pin through which the user may set said hysteresis of said switching regulator when said switching regulator operates in Burst Mode.

16. The switching regulator of claim 1 wherein said switching regulator is a step-up regulator.

17. The switching regulator of claim 5 wherein said control circuit further comprises a diode disposed between said inductor and said output terminal.

18. In a switching regulator that provides output current to a load at a regulated voltage, a method for operating said switching regulator in Burst Mode, the method comprising:
   coupling an input terminal to a source of input voltage;
   coupling an output terminal to said load;
   providing an adjustable burst threshold level, said burst threshold level controlling a minimum peak inductor current level of said switching regulator;
   enabling a user to set an adjustable hysteresis when said switching regulator operates in Burst Mode;
   regulating the output current to said load;
   enabling sleep mode by tripping a burst comparator; and
   de-asserting sleep mode by untripping said burst comparator, said hysteresis controlling when said burst comparator untrips.

19. The method of claim 18 wherein said method further comprises:
   setting a mode of operation for said switching regulator based on an input signal from a single input pin; and
   setting said burst threshold level and said hysteresis of said switching regulator based on said input signal.

20. The method of claim 18 wherein said method further comprises:
   setting a mode of operation for said switching regulator based on a mode selection signal from a mode selection input pin; and
   setting said burst threshold level and said hysteresis of said switching regulator based on an input signal from a burst threshold level and hysteresis selection input pin.

21. The method of claim 18 wherein said method further comprises:
   setting a mode of operation for said switching regulator based on a mode selection signal from a mode selection input pin;
   setting said burst threshold level based on a signal from a burst threshold level selection input pin; and
   setting said hysteresis of said switching regulator based on a signal from a hysteresis selection input pin.

22. A switching regulator that supplies output current at a regulated voltage to a load, said switching regulator being capable of operating in Burst Mode, said switching regulator comprising:
   an input terminal;
   an output terminal coupled to said load;
   a control circuit coupled to said input and output terminals, said control circuit regulating the output current; and
   an adjustment circuit coupled to said control circuit for enabling a user to set setting at least a hysteresis of said switching regulator when said switching regulator operates in Burst Mode.

23. The switching regulator of claim 22, wherein said adjustment circuit further permits the user to set a burst threshold level of said switching regulator when said switching regulator operates in Burst Mode.

24. The switching regulator of claim 23, wherein said adjustment circuit further permits the user to select a mode of operation for said switching regulator, said mode of operation being either forced continuous or Burst Mode.

25. A switching regulator that supplies output current at a regulated voltage to a load, said switching regulator being capable of operating in a first operational mode having at least a length of time dependent on load conditions in which active switching elements are made to remain OFF, said switching regulator comprising:
   an input terminal;
   an output terminal coupled to said load;

a control circuit coupled to said input and output terminals, said control circuit regulating the current supplied to said load; and an adjustment circuit coupled to said control circuit for enabling a user to set a burst threshold level and a hysteresis of said switching regulator when said switching regulator operates in said first operational mode.

26. The switching regulator of claim 25, wherein said control circuit is configured to turn OFF additional components of said switching regulator during when the active switching elements are made to remain OFF.

* * * * *